United States Patent

Skiver et al.

[11] Patent Number: 5,546,888
[45] Date of Patent: Aug. 20, 1996

[54] SURFACE MOUNTED GAUGE WITH ILLUMINATED POINTER

[75] Inventors: Steven G. Skiver; Mankong H. Leung, both of Kokomo, Ind.

[73] Assignee: Delco Electronics Corporation, Kokomo, Ind.

[21] Appl. No.: 303,978

[22] Filed: Sep. 9, 1994

[51] Int. Cl.$^6$ .............................. G01D 11/28; G01R 1/08
[52] U.S. Cl. .................. 116/286; 116/284; 116/DIG. 36; 116/DIG. 6; 116/332; 362/23; 362/26; 362/31
[58] Field of Search ..................................... 116/288, 327, 116/328, 329, 330, 331, 332, DIG. 6, DIG. 23, DIG. 36, DIG. 45, 62.1, 62.2, 62.3, 62.4, 286, 287; 324/146, 151 A, 154 PB; 362/23, 26, 27, 29, 30, 31

[56] References Cited

U.S. PATENT DOCUMENTS

| | | | |
|---|---|---|---|
| 2,290,278 | 7/1942 | Failla | 116/287 |
| 4,959,759 | 9/1990 | Kohler | 362/80 |
| 5,062,135 | 10/1991 | Ohike | 324/154 R |
| 5,084,698 | 1/1992 | Sell | 116/288 X |
| 5,142,456 | 1/1992 | Murphy | 362/26 |

FOREIGN PATENT DOCUMENTS 6-137902  5/1994  Japan ..................................... 116/328

*Primary Examiner*—William A. Cuchlinski, Jr.
*Assistant Examiner*—Willie Morris Worth
*Attorney, Agent, or Firm*—Jimmy L. Funke

[57] ABSTRACT

An automotive instrument cluster has closely spaced face plate and circuit board and a compact gauge including a housing mounted on the side of the circuit board facing the face plate. A light conducting pointer has a two-part snap-together hub extending into the gauge housing and an end face adjacent surface mount LEDs on the circuit board for direct pointer illumination. A gear on the hub is driven by another gear on a stepper motor which is offset from the pointer hub. The stepper motor has a permanent magnet armature supported by the housing and the circuit board, and surface mount electromagnets on the circuit board to provide a motor field.

14 Claims, 1 Drawing Sheet

SURFACE MOUNTED GAUGE WITH ILLUMINATED POINTER

FIELD OF THE INVENTION

This invention relates to an instrument panel gauge having an illuminated pointer and particularly to such a gauge with direct illumination of the pointer and a compact package.

BACKGROUND OF THE INVENTION

Automotive instrument clusters usually employ a face plate having a body of transparent light conducting material and a decorative outer applique which includes legends and indicia for gauges. Gauges mounted behind the face plate have translucent pointers which are arranged to sweep along the indicia to reveal vehicle speed, engine temperature, fuel level and other vehicle parameters. To afford visibility at night the pointers are indirectly illuminated by lamps arranged around the periphery of the face plate which conducts some of the light to each pointer. Since the light sources are far away from the pointers much light intensity is lost in transition. Accordingly that scheme employs bright light sources which may consume much power. Further, due to the necessity of uniformly lighting several gauge pointers, the design of such a face plate requires substantial time and expense.

It is apparent that the elimination of such an indirect lighting system would allow a wider choice of materials for the face plate, simplifying the design of the face plate including making it thinner and, if properly executed by direct lighting, the bright light sources could be replaced by efficient low power sources which may even yield brighter pointer illumination.

Previously, applying direct lighting to conventional air core gauges has proven to be difficult in view of the presence of the gauge motor at the end of the pointer hub which is the optimum location for a light source. The size of the air core gauge dictates a thick instrument cluster assembly, and the provision of direct pointer lighting tends to further increase the size. However, in view of space limitations in vehicle dashboards, it is desirable to decrease the thickness of the instrument cluster, not increase it.

SUMMARY OF THE INVENTION

It is therefore an object of the invention to eliminate the need for a light conducting face plate in an instrument cluster having illuminated pointers. It is another object in such a cluster to minimize the cluster thickness. Another object is to provide bright pointer illumination with low power light sources.

The invention is carried out by employing an offset gauge drive with surface mount technology for reducing gauge package size while expediting direct pointer illumination. Offsetting the drive to a position laterally spaced from the pointer axis allows the light source to be placed in the preferred location for lighting efficiency and also facilitates reduction of cluster thickness. Surface mount light emitting diodes (LEDs) require little space and provide bright pointer illumination. The gauge motor preferably utilizes surface mount electromagnets. Surface mount components typically are designed to have small package sizes and are characterized by mounting pads for soldering directly to a circuit board; thus they are especially well adapted to automatic assembly methods.

A printed circuit board for supporting gauge components and LEDs as well as supplying the necessary electrical feeds to the gauges and LEDs is closely spaced from a face plate. An applique on the front of the face plate includes gauge indicia and may be illuminated either by front lighting or back lighting. A gauge housing mounted on the circuit board on the side facing the face plate has a hole aligned with a similar hole in the face plate for receiving the hub of a pointer. The hole in the housing has a bearing surface or a separate bearing element to rotatably support the hub. In addition, one end of the hub is rotatably mounted to the circuit board by a pin and the hub end is spaced sufficiently from the circuit board to accommodate surface mount LEDs opposite the face. The other end of the hub is joined to the pointer needle which, of course, is located to sweep across the front surface of the face plate. Light from the surface mount LEDs impinges on the end face of the hub and travels through the hub and the needle for efficient illumination.

The pointer is made of light conducting material and its hub is formed in two parts, a first part residing in the housing and a second part attached to the needle and extending through the face plate and the housing and assembled to the first part by a snap-together connection. The first part carries an external gear for driving the pointer.

A stepper motor offset from the hub axis includes a plurality of surface mount electromagnets on the circuit board to establish a magnetic field just above the surface of the board, and an armature mounted in the field and supported by the circuit board and the housing for rotation. A gear carried by the armature meshes with the gear on the hub to drive the pointer in accordance with motor rotation. Electronic drive circuits on the circuit board control the stepper motor and supply the LEDs.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
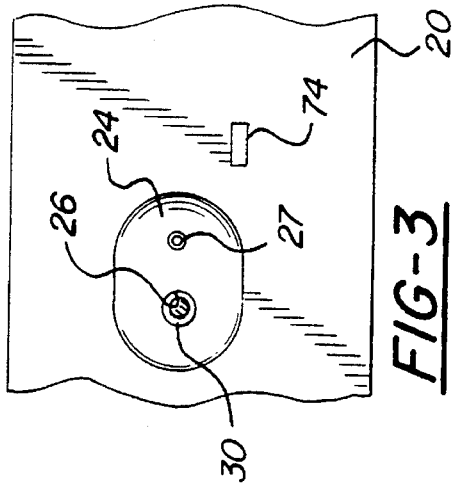
FIG. 1 is a partial front view of an instrument cluster having gauges with illuminated pointers and suitable for employing the invention.
Figure 3:
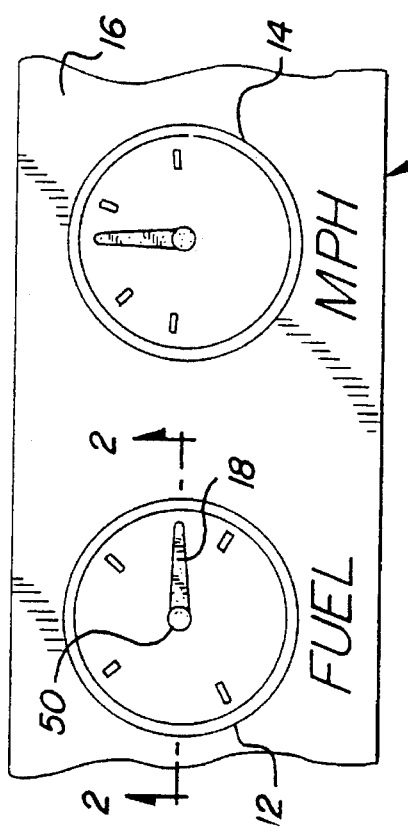
FIG. 3 is a partially sectioned view of a circuit board and gauge housings taken along line 3—3 of FIG. 2.
Figure 2:
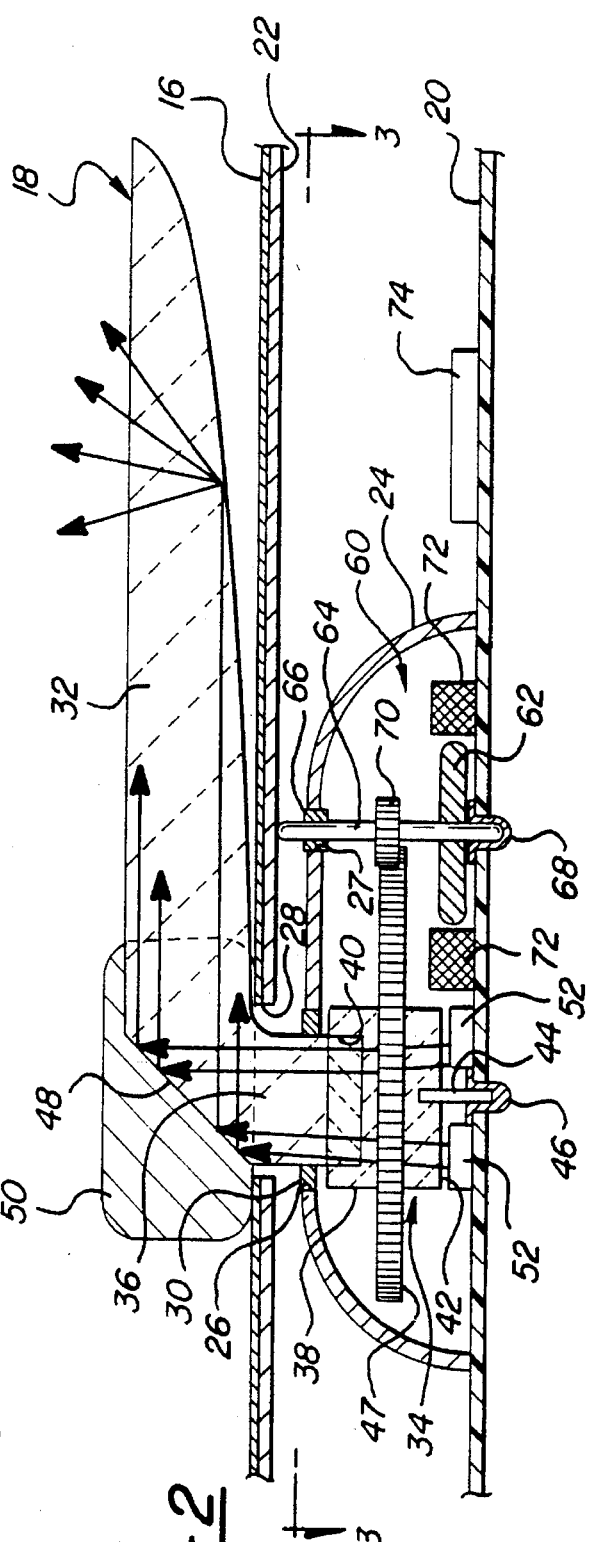
FIG. 2 is a cross section of a gauge according to the invention taken along line 2—2 of FIG. 1.

Referring to FIGS. 1 and 2 of the drawings, an instrument cluster 10 includes gauges 12 and 14 indicating fuel level and vehicle speed, for example. The externally visible portions of the cluster comprise an applique 16 including indicia and legends, and illuminated pointers 18. FIGS. 2 and 3 further reveal a circuit board 20 which supports the gauges, and a face plate 22 which carries the applique 16, comprising a film or coating, on its front surface. The face plate 22 may be of any desired material and may be translucent if back lighting is desired, such lighting being effected by lamps, not shown, between the circuit board 20 and the face plate 22.

Each gauge has a housing 24 attached to the circuit board 20 to define a gauge cavity. The housing 24 has an aperture 26 aligned with a similar aperture 28 in the face plate 22. The aperture 26 in the housing 24 is fitted with an annular bearing element 30 or alternatively the edge of the aperture 26 is formed with a bearing surface. A second smaller aperture 27 in the housing spaced from the aperture 26 is similarly equipped with a bearing surface or bearing element.

The pointer 18 includes a needle 32 attached to a two-part hub 34. One portion 36 of the hub 34 is attached directly to and is integral with the needle 32, and extends through the apertures 28 and 26 and is supported for rotation in the bearing element 30. The second portion 38 of the hub 34 resides wholly within the gauge housing and has a cavity 40 in one end for receiving an end of the first portion 36, the two portions thereby having male and female socket members. The cooperating ends of the first and second hub portions are tapered to effect a tight fit or are shaped as with a ring and groove to effect a snap fit. Thus the needle can be attached to the remainder of the gauge after the circuit board and face plate are assembled. An end face 42 of the second portion 38 opposite the cavity 40 is spaced a small distance from the circuit board 20. The second portion is mounted by an axial pin 44 extending from the end face 42 and received in a cup-like bearing element 46 mounted in the circuit board 20 on the axis of rotation of the pointer. A gear 47 is formed on the second portion 38 or attached thereto. The inner end of the needle 32 in the region of the hub has an angled reflective surface 48 to redirect light from the hub toward the other end of the needle (as indicated by arrows) in accordance with conventional practice for illuminated pointers. A conventional decorative cap 50 covering the hub end of the needle masks the escape of stray light. A pair of surface mount LEDs 52 are secured to the surface of the circuit board 20 adjacent to the end face 42 of the second portion of the hub to provide the light source for direct pointer illumination.

A stepper motor 60 is contained in the housing offset from the axis of the pointer. An armature 62 comprising a permanent magnet is carried by a spindle 64 and supported close to the circuit board. A bearing 66 in the aperture 27 of the housing 24 supports one end of the spindle 64 for rotation and a bearing element 68 in the circuit board supports the other end. A gear 70 on the spindle 64 meshes with the gear 47 to drive the pointer according to armature rotation. The gear ratio, determined by the gear diameters, affords a torque multiplication. Preferably the driving gear 70 is much smaller in diameter than the hub gear 47. A plurality of surface mount electromagnets 72 provide a magnetic field for controlling armature rotation. From two to six such electromagnets 72 may be used but four is the preferred number, affording a compromise between resolution and simplicity. Electronic driving circuitry 74 mounted on the circuit board furnishes current to the magnets in accordance with parameter input signals to rotate the armature an amount appropriate to set the needle at the correct gauge position. The same driving circuitry or separate circuits can be used to supply current to the LEDs 52. As is already known, a stepper motor used for a gauge drive is operated by initially rotating the motor until the needle reaches a fixed stop which establishes a zero or home position, and then operating the motor a number of steps corresponding to the parameter value to be indicated. Subsequent changes in the parameter are reflected by steps in either direction.

It will thus be seen that the positioning of the light source directly adjacent the hub end face permits maximum light transfer efficiency. The improved efficiency, compared to the conventional indirect illumination via the face plate, permits brighter pointer illumination along with a great reduction in power consumption. In addition, due to the offset motor configuration and the use of surface mount components, the cluster thickness can be made small. The spacing of the circuit board from the face plate may be on the order of one inch.

The embodiments of the invention in which an exclusive property or privilege is claimed are defined as follows:

1. In an automotive display having a printed circuit board, a gauge pointer assembly comprising:
    a light conducting pointer having a hub and a needle, the hub being rotatably mounted on the circuit board for pointer rotation about an axis;
    a light source means mounted on the circuit board adjacent the hub for pointer illumination;
    a magnetic armature movably mounted on the circuit board and offset from the axis;
    electromagnetic field means mounted on the circuit board adjacent the armature for controlling armature movement; and
    drive means coupling the armature and the pointer for rotating the pointer in response to armature movement.

2. The invention as defined in claim 1 wherein the light source comprises at least one light emitting diode.

3. The invention as defined in claim 1 wherein the armature is mounted for rotation about an axis laterally spaced from the hub axis; and
    the drive means transfers rotation of the armature to the pointer hub.

4. The invention as defined in claim 1 wherein:
    the field means comprises electromagnets mounted directly on the circuit board for producing a field to effect armature rotation; and
    the armature comprises a permanent magnet in the field and mounted for rotation about an axis laterally spaced from the hub axis.

5. The invention as defined in claim 1 wherein:
    the hub has an end face spaced from the circuit board; and
    the light source is mounted between the end face and the circuit board for illuminating the pointer.

6. The invention as defined in claim 1 wherein:
    the pointer includes a pin extending from the hub for pivotal mounting on the circuit board, the pin establishing a space between the hub and the circuit board; and
    the light source means comprises at least one surface mount light emitting diode in the space for illuminating the pointer.

7. In an automotive display having a face plate with inner and outer surfaces including an aperture, a circuit board spaced from the inner surface of the face plate, and indicia on said outer surface a gauge comprising:
    a housing mounted on the circuit board between the circuit board and the face plate and having an opening opposite the aperture in the face plate, the housing and the circuit board defining a gauge cavity;
    a light conducting pointer having a needle movable across the outer surface of the face plate cooperable with said indicia and a hub extending from the needle into the gauge cavity;
    means for supporting the hub on the circuit board for rotation in the opening and in the aperture about a first axis, the hub having an end face spaced from the circuit board;
    a light source means on the circuit board opposite the end face of the hub for illuminating the pointer;

a gauge motor in the cavity mounted for rotation about a second axis; means for activating the motor mounted on the circuit board and drive means for coupling the motor to the hub for pointer rotation.

8. The invention as defined in claim 7 wherein the motor comprises:

a permanent magnet armature mounted in the cavity for rotation about the second axis; and field coils surface mounted on the circuit board for driving the armature.

9. The invention as defined in claim 7 wherein in the light source means comprises a plurality of surface mount light emitting diodes.

10. The invention as defined in claim 7 wherein the hub is a two part member comprising:

a first portion within the cavity mounted for rotation on the circuit board under control of the drive means and including the end face of the hub; and a second portion integral with the needle and extending through the aperture and the opening, the second portion being axially aligned with and assembled to the first portion.

11. The invention as defined in claim 10 wherein the first and second portions include cooperating male and female socket members for assembly of the two portions.

12. The invention as defined in claim 10 wherein:

the opening in the housing includes a bearing surface; and the bearing surface supports the second portion of the needle for rotation relative to the housing.

13. The invention as defined in claim 10 wherein the means for supporting the hub on the circuit board comprises:

a pin projecting from the first hub portion on the first axis; and bearing means on the circuit board for rotatably supporting the pin.

14. The invention as defined in claim 10 wherein:

the drive means comprises a gear drive having a drive gear on the motor and a driven gear on the first portion of the hub.

* * * * *